United States Patent [19]
Audoin

[11] Patent Number: 5,870,361
[45] Date of Patent: *Feb. 9, 1999

[54] DEVICE AND SYSTEM FOR READING RECORDING MEDIA WITH CROSS-TALK CORRECTION CIRCUITRY

[75] Inventor: Michel Audoin, Villeneuve St. Georges, France

[73] Assignee: Thomson-CSF, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 574,410

[22] Filed: Dec. 15, 1995

[30] Foreign Application Priority Data

Dec. 23, 1994 [FR] France .................................. 94 15583

[51] Int. Cl.$^6$ ........................................................ G11B 7/00
[52] U.S. Cl. ...................... 369/44.41; 369/124; 369/120; 369/54; 386/115
[58] Field of Search ..................................... 369/107, 111, 369/44.37, 44.41, 124, 120, 54; 386/115, 126, 22; 250/208.2, 208.3

[56] References Cited

U.S. PATENT DOCUMENTS 5,124,869   6/1992   Lehureau ................................ 360/121

FOREIGN PATENT DOCUMENTS 0 540 385   5/1993   European Pat. Off. .
2 569 072   2/1986   France .
94 15335   7/1994   WIPO .

OTHER PUBLICATIONS

Ryuichi Katayama, et al. "Multi–Beam Optical Disk Drive for High Data Transfer Rate Systems", *Japanese Journal of Applied Physics*, Part 1 (Regular Papers and Short Notes), vol. 31, No. 2B, Feb. 1992, pp. 630–634.

Patent Abstracts of Japan, vol. 011, No. 153 (p–577), May 19, 1987 & 61 287056 (Toshiba Corp), Dec. 17, 1986, abridged.

*Primary Examiner*—Alan Faber
*Attorney, Agent, or Firm*—Oblon, Spivak, McClelland, Maier & Neustadt, P.C.

[57] ABSTRACT

A device and system for the reading of a recording medium, which enables the reading of high-density information and the removal of disturbance (or cross-talk) from the information. The invention includes chiefly a reading device carrying out the parallel reading of the information from N pixels of an optical detector array and giving at least two sub-trains of samples in series (X, Y, Z), a cross-talk correction circuit for each sub-train of samples, each sub-train giving a train of cross-talk corrected samples (X', Y', Z'), and an input sequencer giving each correction circuit a train of samples to be corrected (Ys) from a first sub-frame of samples (Y) and samples (XN-1, Z0) from at least one second frame of samples (X,Z). This device and system can be applied to the reading of high-density recording media (magnetic or optical).

13 Claims, 16 Drawing Sheets

DEVICE AND SYSTEM FOR READING RECORDING MEDIA WITH CROSS-TALK CORRECTION CIRCUITRY

BACKGROUND OF THE INVENTION

The invention relates to a reading device and system.

The invention can be applied especially to the reading of magnetic or optical recordings and, in this context, to the reading of recordings in recording systems such as computer peripherals and all types of professional systems.

It can be extended to recordings on optical tape and magnetic or optical disks provided that several adjacent information elements are to be read thereon in parallel.

The high-density recording of information on a recording medium raises a problem of disturbance (or cross-talk) when the information elements are very close to one another. A correction of cross-talk is then needed to optimize the performance characteristics of the system.

The French patent application No. 92 15474 (U.S. Pat. No. 5,493,553) describes a system for the correction of cross-talk in a system for the reading of multiple-track recordings. High-density recording on parallel tracks raises a twofold problem in re-reading: these relate to track following and track separation. The small width of the tracks (less than 20 $\mu$m) means that it is difficult, on a tape reader, to ensure the precision of the track-following operation solely by the mechanical guidance of the edge of the tape. The need to ensure the inter-operational quality of the tapes and readers increases this difficulty.

Referring to FIG. 1 it can be seen that, in a system such as this, several tracks BD1–BDn are read simultaneously by means of a magneto-optical system TL using a linear CCD sensor TL6. The cross-talk from the first neighboring tracks of each track is computed in real time. FIG. 2 shows that the N information elements on the tracks BD1–BDn are read by the CCD sensor TL6 and received by a cross-talk corrector 1. Since the train of samples in series X corresponds to consecutive tracks BD1–BDn, it is arranged in the sequence 1, 2, ..., N–1, N, 1, 2, ... if the number of tracks analyzed is N. The corrector corrects the cross-talk in real time in taking account of the previously computed coefficients and of the known values of the disturbance-causing neighbors and transmits a train of corrected samples X'. This system therefore enables the cross-talk coming from the first neighboring tracks to be eliminated.

However, in this system, the linear CCD sensor, through its optical/electronic transfer characteristics, sets the overall electrical performance values and, especially, the bit rate of the device. To obtain higher information bit rates, it is therefore necessary to increase the scanning rate of the CCD.

It is an object of the invention to increase the bit rate of the system and hence increase the processing speed.

The French patent application No. 94 14147 (U.S. Pat. No. 5,703,845) describes a system for the correction of cross-talk in a reading system that uses commercially available fast CCD sensors that provide differentiated outputs for the even-parity and odd-parity photodetectors. In order to double the sampling rate, the pixels are classified in two groups depending on the parity of their rank. There are then obtained, at the output of an N-pixel CCD, two simultaneous frames formed by N/2 samples corresponding to the N/2 photodiodes of each group. However, this type of CCD sensor cannot be used to read a very large number of tracks at a high bit rate.

The present invention uses CCD sensors whose line of sensors is sub-divided and therefore has several intermediate outputs to sustain high bit rates. With each output, there is associated a set of N photodetectors, each giving an information element (or sample) that is an image of its respective track at a fixed rate. At output of the CCD, there are then obtained several trains of simultaneous sub-frames constituted by N samples corresponding to the N photodiodes of each group, hence to N adjacent tracks. The information elements coming from all the trains during a sub-frame constitute a frame. The duration of a sub-frame is actually equal to M clock cycles for it is necessary to add "inactive" cycles, the number of which is M–N. These cycles are inactive from the point of view of useful information, but are necessary to complete the discharge, out of the component, of the charges collected by the photodiodes.

The basic principle of cross-talk correction in the French patent application No. 92 15474 can be applied for a single train of samples in series corresponding to consecutive tracks and therefore ordered according to the sequence 1, 2, ..., N–1, N, 1, 2, ... should N tracks be analyzed. Another problem therefore arises. This is the problem of correcting cross-talk for multiple trains of signals coming from different groups of photodiodes.

For this purpose, the invention uses a cross-talk correction circuit for each train. Each circuit is essentially the same as the one already used in the system with only one frame as described in the French patent application No. 92 15474 (U.S. Pat. No. 5,493,553). Each correction circuit needs three successive samples if the cross-talk should be limited to the first neighbors. These three samples correspond to a central track and to its right-hand and left-hand neighbors. However, for samples located at the end of each sub-frame, one of the neighboring samples belongs to a different sub-frame. Although it is possible simply to refrain from correcting the end samples for cross-talk or to assign them less important information such as a reference signal, this leads to a major reduction of the bit rate in the case of short CCD "fragments" (for example 2/16 in the case of a 16-pixel CCD sensor). However, the invention corrects all the samples of a multiple-output CCD and requires a special sequencing to process the first and last samples of each sub-frame.

Preferably, this sequencing makes use of the "inactive" cycles present in a CCD frame.

SUMMARY OF THE INVENTION

The invention therefore relates to a device for the reading of a recording medium (BD) comprising at least one frame of information elements positioned side by side on the information medium, and comprising:

a reading means (TL6) carrying out the parallel reading of the information frame giving a train of samples in series ($X_{p-1}(k), X_p(k), X_{p+1}(k)$) corresponding to information elements on the recording medium; and a cross-talk correction circuit (1) correcting the cross-talk on a central sample ($X_p(k)$) by means of neighboring samples ($X_{p-1}(k), X_{p+1}(k)$);

wherein:

the reading means (TL6) are sub-divided and give at least a first sub-frame and a second sub-frame of samples in series (X,Y,Z); and wherein it comprises:

a cross-talk correction circuit (2) for each sub-frame of samples giving a train of samples corrected for cross-talk (X',Y',Z'); and an input sequencer (3) giving each correction circuit (2) a train of samples to be corrected (Ys) from a first sub-frame of samples (Y) and samples (XN−1,Z0) from at least one second frame of samples (X,Z).

BRIEF DESCRIPTION OF THE DRAWINGS

The different objects and features of the invention shall appear more clearly from the following description and from the appended figures, of which.

MORE DETAILED DESCRIPTION

Figure 1:
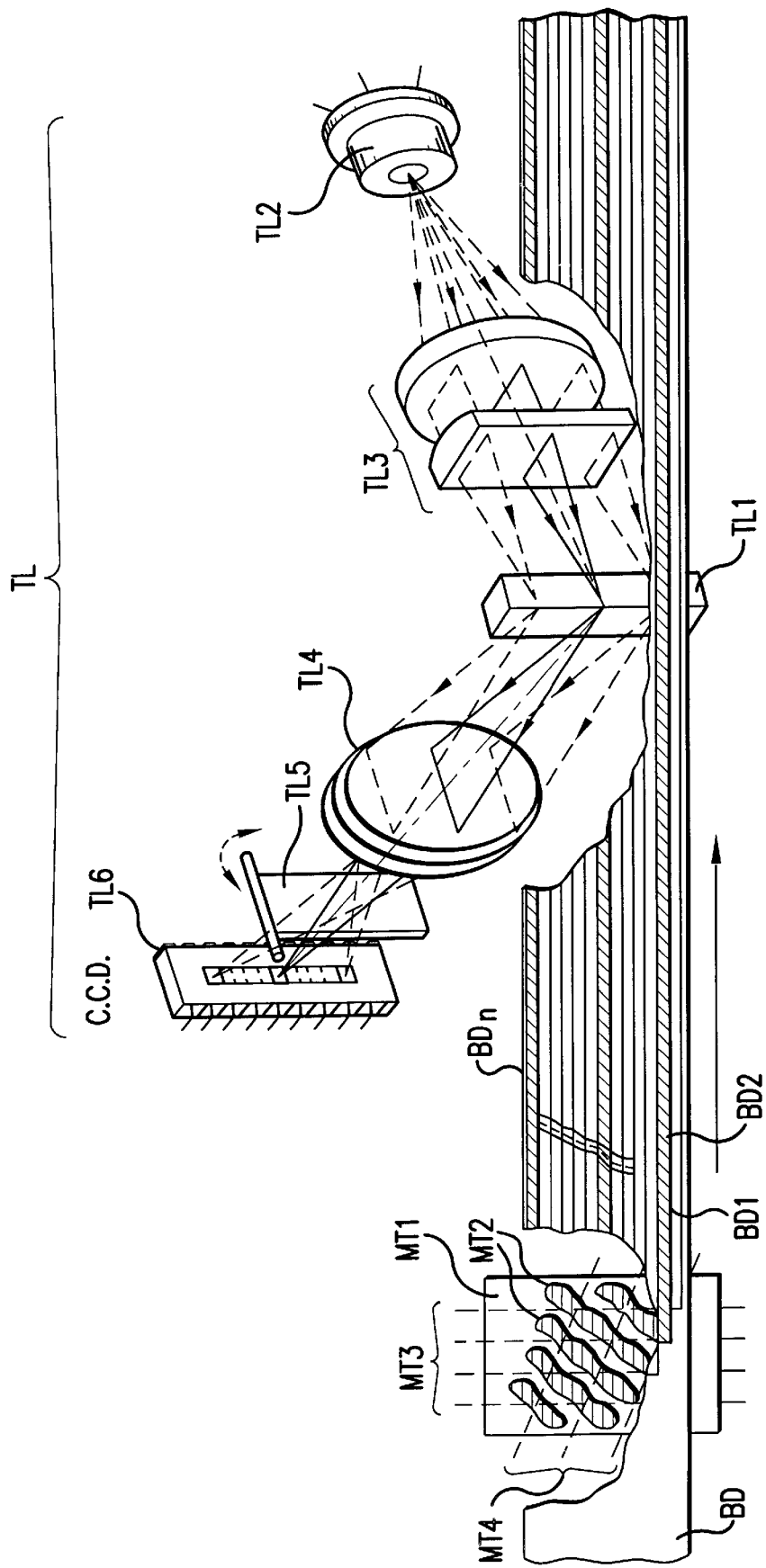
FIG. 1 shows a system for the recording-reading of magnetic tapes wherein the reading is done with a magneto-optical system.
Figure 2:
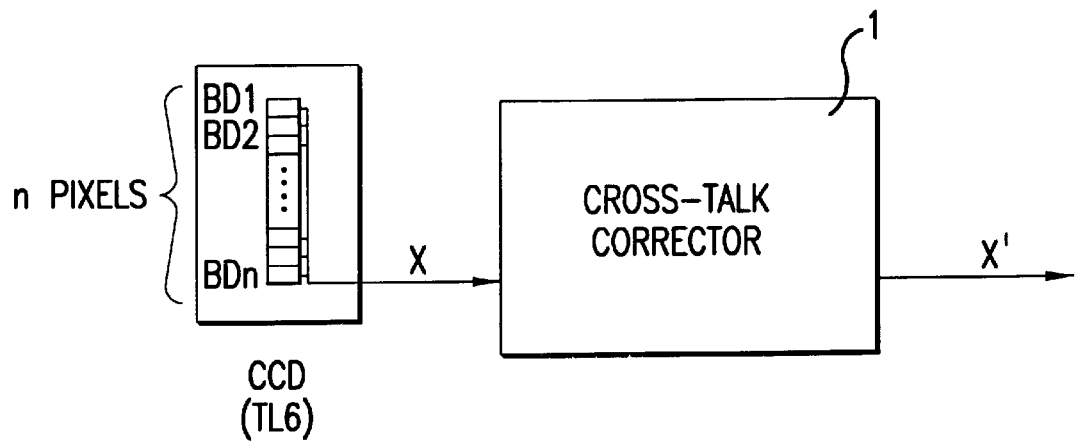
FIG. 2 shows a cross-talk corrector in the prior art system.

Referring to FIG. 1, a description shall be given first of all of a recording/reading system to which the invention can be applied.

This system has a recording medium such as a magnetic tape BD. A matrix recording head MT1 has a matrix of elementary heads MT1 controlled by row selection conductors MT3 and data selection conductors MT4. This head enables the recording, on the tape BD, of different tracks of information elements BD1, BD2, . . . , BDn each corresponding to an elementary head of the matrix head MT1. This recording head is of the type described for example in the French patent application No. 88 05592 which corresponds to U.S. Pat. No. 5,124,869.

The right-hand part of the figure shows a magneto-optical reading head TL such as that of the French patent application No. 89 17313.

This head TL has a magneto-optical transducer TL1 (working by Kerr effect for example) positioned in parallel to the plane of the magnetic tape, the big length of which is transversal to the length of the tape. A light source TL2, by means of a polarized light beam and through a focusing system TL3, illuminates the transducer TL1 in such a way that the light beam is focused substantially along a line on one face of the transducer TL1 in the vicinity of the magnetic tape BD. The beam reflected by the transducer TL1 has its polarization modified as a function of the magnetic field on the tape. The reflected beam is transmitted by a focusing system TL4 and a track-following system TL5 to an optoelectronic detector TL6 comprising, for example, a CCD type charge transfer device.

The detector TL6 has at least as many detector elements as there are tracks on the tape.

The transducer TL1 reflects a beam towards the detector TL6. This beam is actually formed by a set of track reading beams each having had its polarization influenced by a track of the magnetic tape. All these reading beams are received by the detector TL6 which thus enables the detection of the information elements read on each track of the tape BD.

The magneto-optical transducer is not etched and has a continuous reading structure. This may contribute to cross-talk in reading. It remains fixed and it is the track-following system TL5 that makes it possible, by deflecting the beam, to provide for dynamic track following.

It is also possible to envisage a direct mechanical shifting of the CCD along its axis.

The optical system may be designed so that each track read is analyzed by one and the same photodiode.

It must be noted that it is advantageous not to shift the mechanical element in contact with the tape (the transducer).

Figure 3:
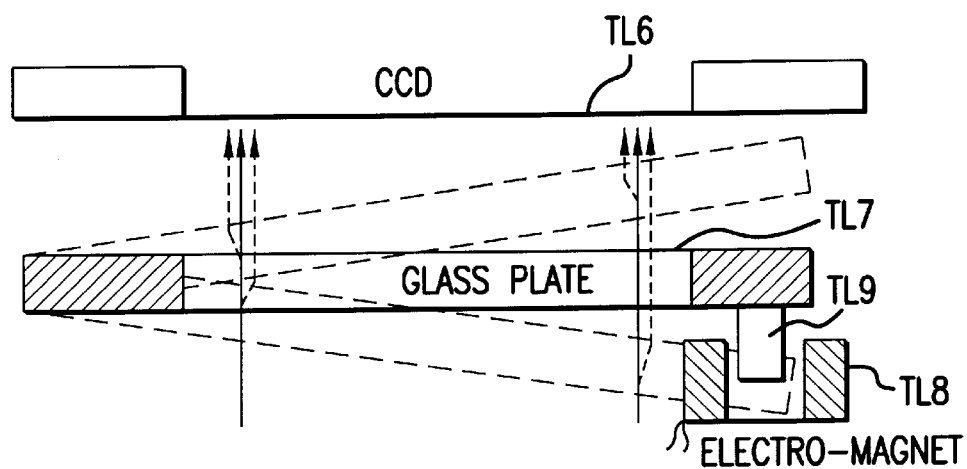
FIG. 3 shows a track following system.

The track-following system TL5 may be made as shown in FIG. 3. It has a glass plate with a parallel face TL7 positioned substantially in parallel to the detector TL6 and rotating about an axis perpendicular to the greatest length of the transducer TL1. The rotation is controlled by an electromagnet TL8 and a solenoid plunger TL9 fixedly joined to the plate TL7. The electromagnet receives electrical track-following information and enables the plate to be oriented so as to appropriately deflect the beam coming from the transducer TL1 towards the detector TL6 and allocate a track-reading beam transmitted by the transducer TL1 to each photodiode.

The control of the plate TL7 can also be provided by any device such as a piezoelectric device.

The track-following system can also be provided by the shifting of the detector TL6, the optical system TL4 and the transducer TL1 with respect to one another.

Figure 4:
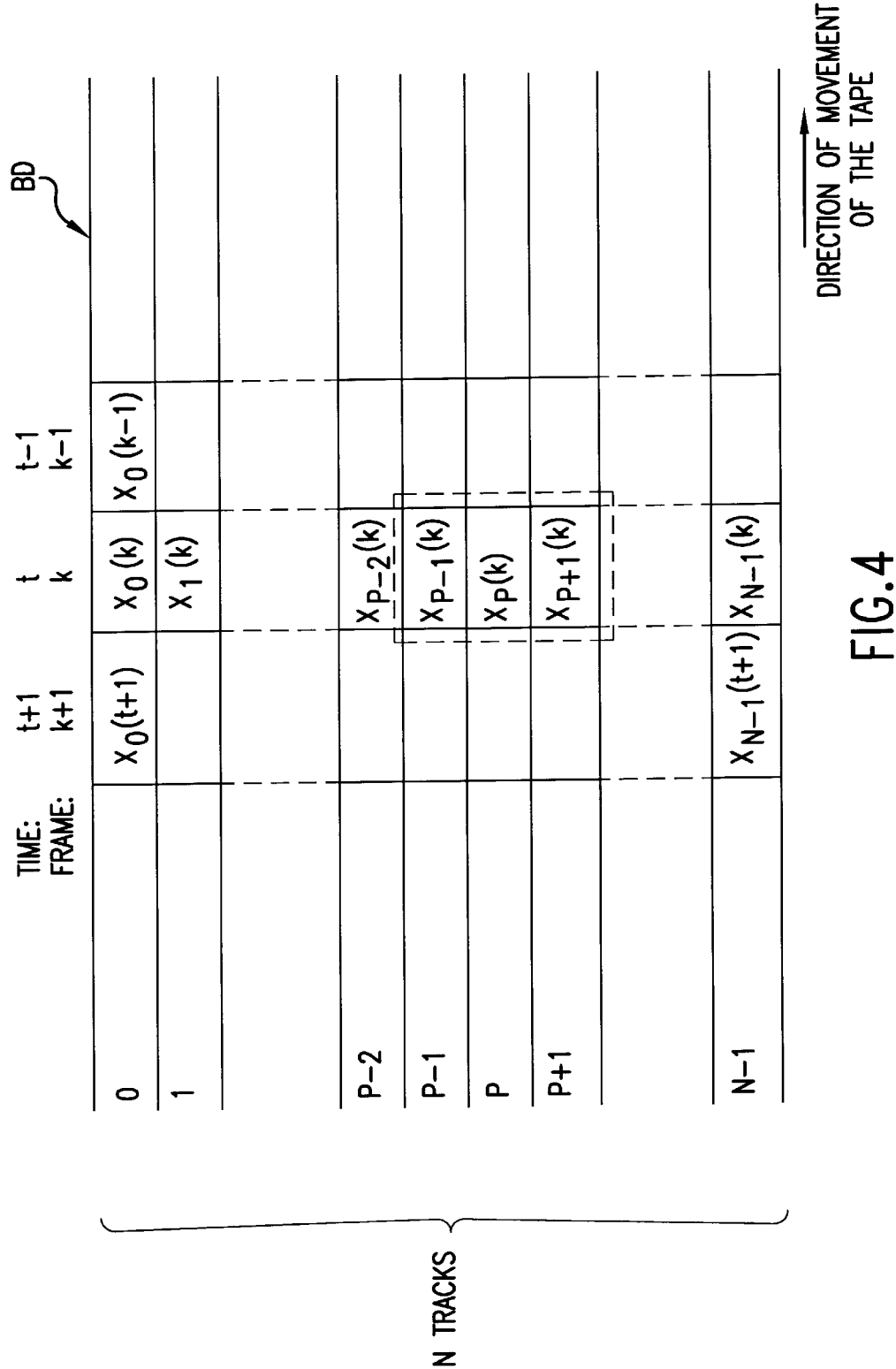
FIG. 4 shows an exemplary organization of the information elements and of the tracks on a magnetic tape.

Referring to FIG. 4, a description shall now be given of an exemplary arrangement of the information elements and tracks on the magnetic tape BD in FIG. 1. At the point in time t, the sub-divided sensor reads the N samples of information elements $X_0(k)$, $X_1(k)$, . . . , $X_{p-1}(k)$, $X_p(k)$, $X_{p+1}(k)$, . . . , $X_{N-1}(k)$ forming a frame k. According to this simplified example, it will be assumed that these samples of information elements which correspond to a frame of input pixels had been recorded in parallel by the recording head MT1. However, the pixels coming from an input frame may be recorded in a staggered way and may, at the time of reading, be over-sampled in such a way that the information elements in the frame read at the instant t do not correspond to the information of the input frame. This does not change the principle of the invention.

We may first of all record the principle of cross-talk correction. To obtain knowledge of the cross-talk undergone by a track $X_p$ due to the first neighbors for example, the information elements coming from the neighboring tracks are considered. In this case, they are the samples $X_{p-1}$ and $X_{p+1}$. These information elements are boxed in dashes in FIG. 4.

Figure 5A:
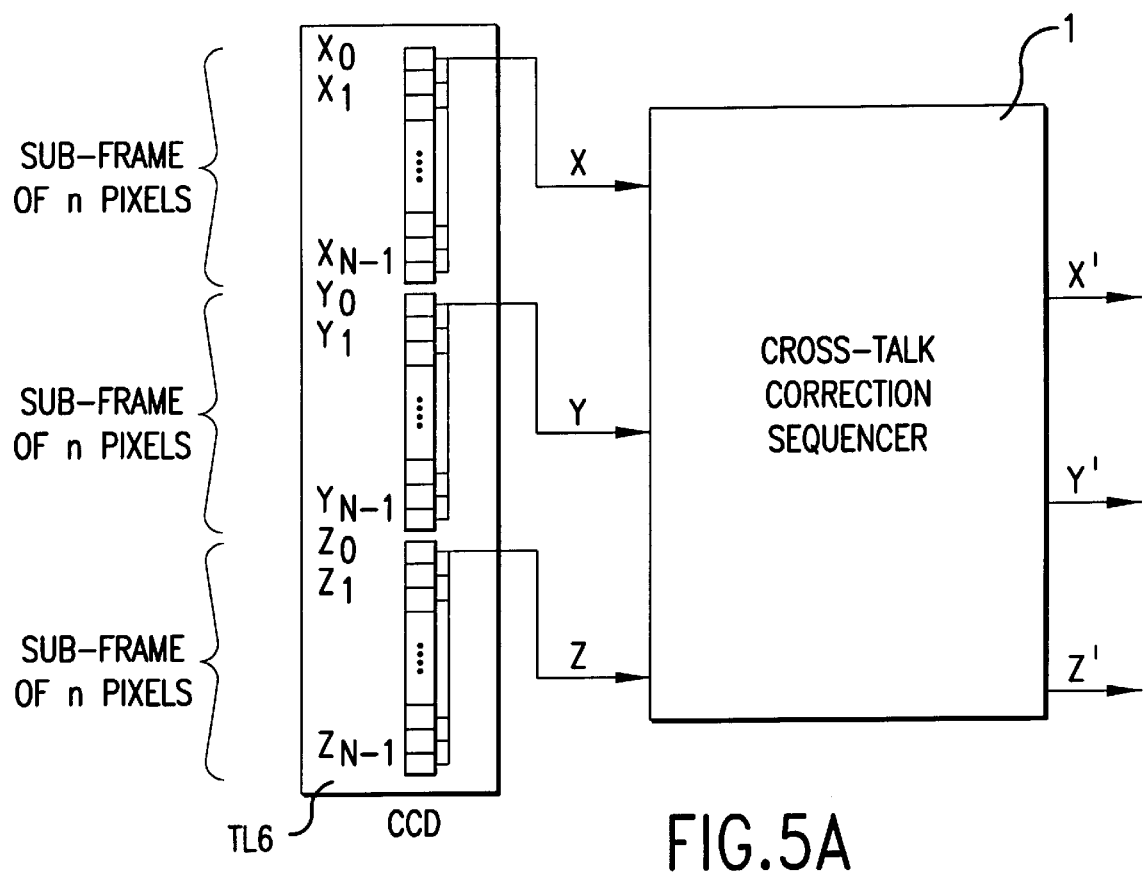
FIGS. 5a to 5e show an exemplary embodiment of the circuit of the invention.

Referring to FIG. 5a, a description shall now be given of an exemplary application for a sub-divided CCD sensor with three outputs. In this example, the sub-divided CCD sensor TL6 reads 3N samples and produces three trains referenced X, Y and Z. Each train has a succession of sub-frames formed by series samples referenced 0 to M−1. The information elements in the three sub-frames form a frame. The three outputs of the CCD are applied to the input of the unit formed by the sequencer and cross-talk corrector 1.

Figure 5B:
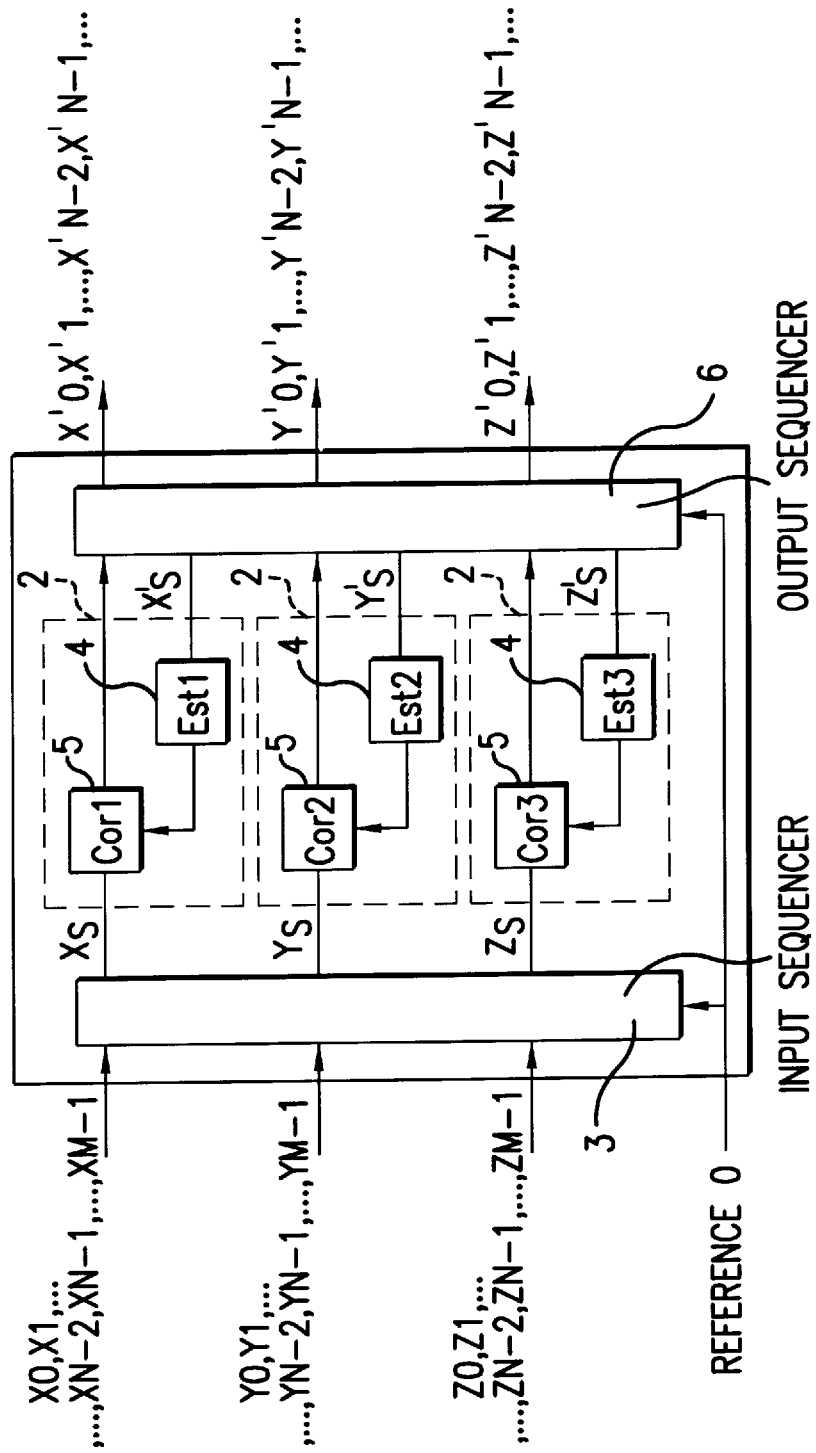

The internal structure of the sequencer-corrector 1 can be seen in FIG. 5b and, in this case, uses three cross-talk correction circuits 2.

It may be recalled that, at the input of each correction circuit 2, three successive samples are needed if only the first neighbors corresponding to a central track and its two neighbors to the right and to the left are considered. However, in a train of one multiple output CCD, for samples located at the end of each sub-frame, one of the neighboring samples belongs to a different train. An input sequencer 3 should then carry out the management between the trains of samples to have accurate information elements available at the appropriate instant.

The reference signal 0 is used by the sequencers for the routing of the data elements.

One advantage of this embodiment is that each cross-talk correction circuit 2 is the same as that already developed for the system using a single train described in the already-mentioned two patents (U.S. Pat. Nos. 5,493,553 and 5,703,845).

Figure 5C:
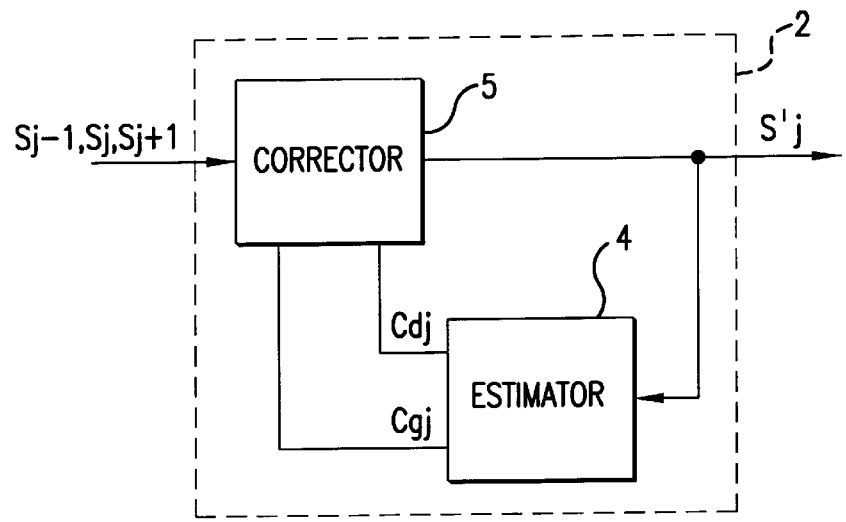

This structure is shown in detail in FIG. 5c. The successive samples are received by a cross-talk correction operator 5 and the cross-talk of the signal Sp is corrected by performing the following operation:

$S'_p = S_p - (C_{dp} * S_{p+1} + C_{gp} * S_{p-1})$.

Cdp and Cgp are the cross-talk coefficients that are computed by the estimation operator 4 and that represent the cross-talk that may exist on the sample of the track p due to the samples located on a track to its right (d) and to its left (g) on the tape in looking at it in the direction of its movement.

Figure 5E:
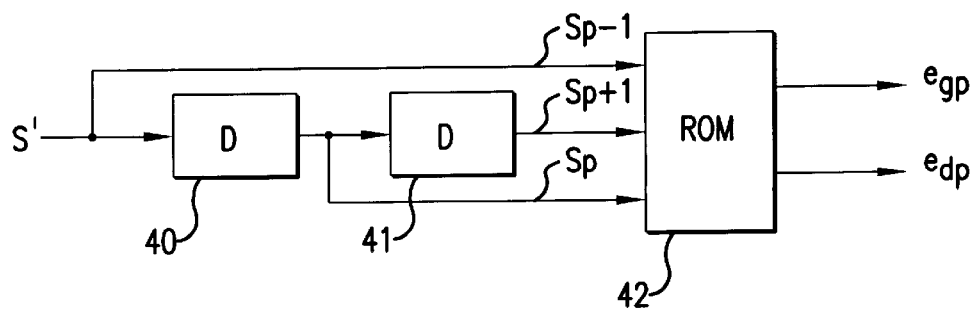
Figure 5D:
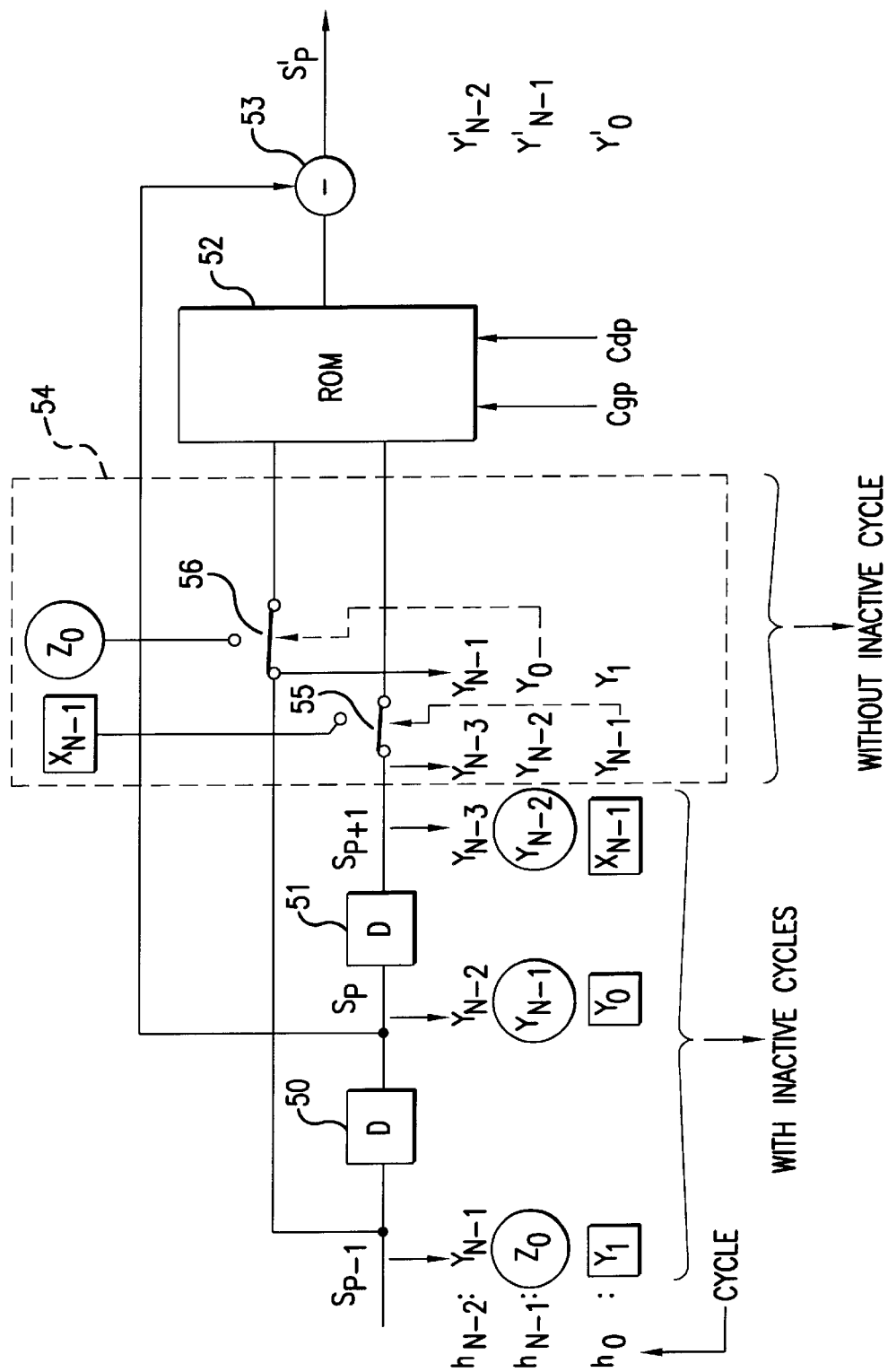

FIG. 5d shows an exemplary embodiment of the correction operator 5 of the invention. This circuit has two delay circuits 50, 51 enabling the resetting of the phase of the signals $S_{p-1}$, $S_p$, $S_{p+1}$ which are supposed to be received in series. A ROM type circuit 52 receives the cross-talk coefficients $C_{gp}$ and $C_{dp}$ as well as the signals $S_{p-1}$ and $S_{p+1}$ and, in exchange, gives $C_{dp} * S_{p+1} + C_{gp} * S_{p-1}$. This result is transmitted to the subtraction circuit 53 which takes the difference between this result and the value of the signal Sp. There is then obtained the cross-talk corrected signal $S'_p$. The multiplexing circuit 54 is not essential and shall be described here below. The correction operator may also be made with binary multipliers.

The cross-talk estimation operator 4 is connected to the output of the cross-talk correction operator 5 and carries out a cross-talk estimation that represents the cross-talk coefficients described here above. The instantaneous value of left-hand cross-talk is estimated by taking the product of the value of a sample multiplied by the sign of the sample located to its left. Similarly, the instantaneous value of right-hand cross-talk is estimated by multiplying the value of a sample by the sign of the sample located to its right. In fact, since the computation of cross-talk 4 is connected to the output of the cross-talk correction operator 5, the cross-talk estimation operator performs an estimation of residual cross-talk of a signal assumed to have been already corrected for cross-talk. Thus, we obtain:

$edp = S'p * Sgn[S'_{p+1}]$ and $egp = S'_p * Sgn[S'_{p-1}]$

FIG. 5e gives an example of a cross-talk estimation operator 4 of the invention in which the signals $S_{p-1}$, $S_p$, $S_{p+1}$ arrive in series. Delay circuits 40, 41 reset the phase of these signals and a circuit 42, for example of the ROM type, computes the residual cross-talk edp and egp.

Figure 6A:
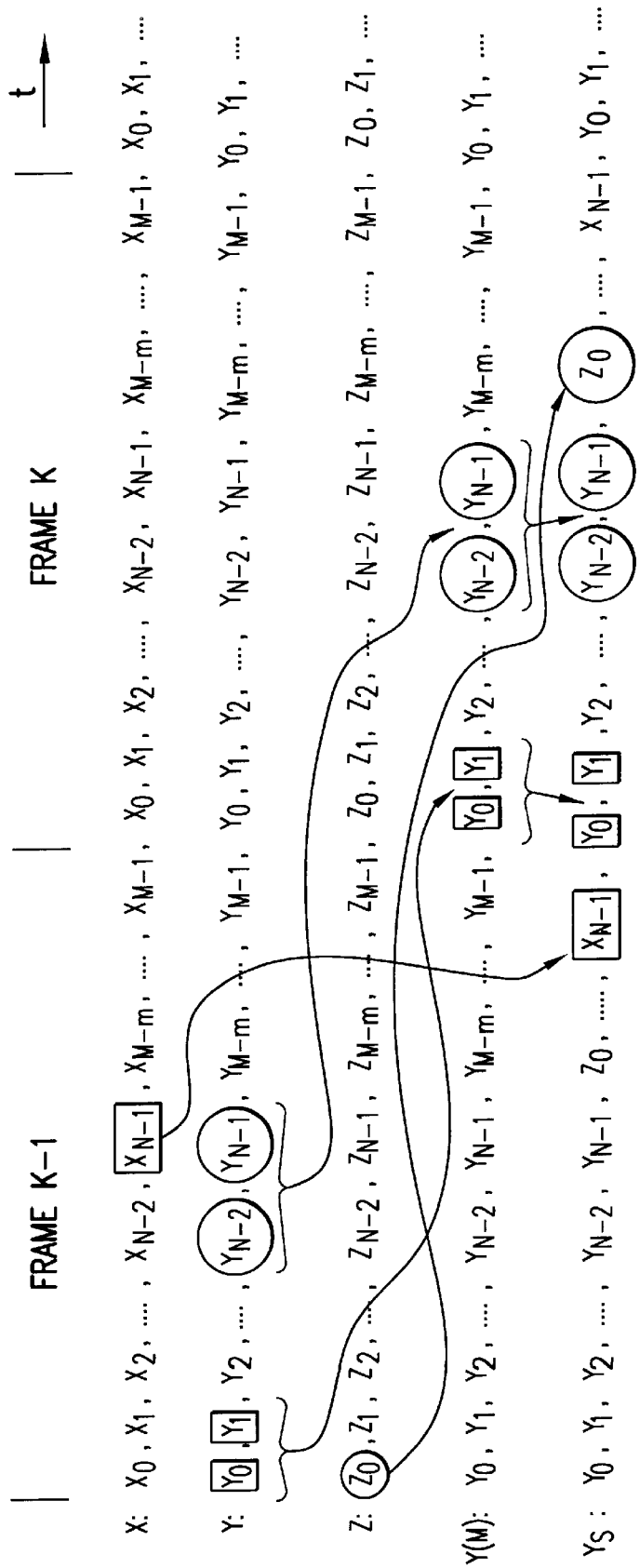
FIGS. 6a and 6b shows an exemplary organization of the information elements at output of the sub-divided CCD sensor.

A description shall now be given of the working of the input sequencer 3 by means of FIG. 6a. It shall be assumed that the sub-divided CCD sensor TL6 reads the 3N tracks and produces three outputs referenced X, Y and Z sequenced in a way shown in FIG. 6a. This means that each output has a succession of sub-frames consisting of series samples referenced (0 to M-1) in each frame (k-1, k). Each sub-frame contains N samples ($X_0$ to $X_{N-1}$) of information elements and m "inactive" cycles ($X_{M-m}$ to $X_{M-1}$) that are generated during the period of discharge of the charges from the CCD.

By way of an example, only the application of the processing for the output Y shall be described in detail. The same approach is valid for the other outputs.

It may be recalled that the object of the input sequencer is to generate triplets of three successive samples for each sample in the train Y corresponding to a central sample and to its two neighbors to the right and to the left. So long as the processing, which is simultaneous on the three trains X, Y and Z, is applicable to the 1 to N-2 ranking samples, the sequencer is almost transparent and does not come into play in the arrangement of the samples since each corrector has available a triplet of the type $[S_{p-1}, S_p, S_{p+1}]$ with S as a CCD output (X, Y or Z) and p as a track.

However, for the processing of the 0 ranking samples, for example $Y_0$, the cross-talk correction circuit 2 of the train Y has to be given the triplet of three consecutive samples $[X_{N-1}, Y_0, Y_1]$ belonging to the same frame. The samples of this triplet for the frame k-1 are indicated in squares in FIG. 6a. Since the sample $X_{n-1}$ is available only at the end of the frame k-1, the sequencer 3 memorizes the signal Y during the frame k-1 and produces a signal Y(M) which represents the train Y delayed by a frame. During the next frame k, the sample prior to $Y_0$ of the signal Y(M), namely $Y_{M-1}$, is replaced by the sample $X_{N-1}$ coming from the train X for the 0 ranking processing (namely $Y_0$ in this example). Thus, there is obtained the train $Y_s$ containing the accurately ordered triplets.

For the processing of the N-1 ranking samples, for example $Y_N$_1, the cross-talk correction circuit 2 of the train Y awaits the triplet $[Y_{N-2}, Y_{N-1}, Z_0]$. The samples of this triplet for the frame k-1 are indicated in circles in FIG. 6a. The storage of the value of $Z_0$, previously done at the start of the frame k-1, and its positioning, in the train $Y_s$, after the sample $Y_{N-1}$ during the frame k ensure the functioning of the corrector for the N-1 ranking samples, Finally, as regards the first track, namely the sample $X_0$ in this example, since it has only one neighboring track ($X_1$), a sample with a neutral value (generally 0), representing a second virtual neighboring track, is inserted for an accurate operation of the cross-talk correction circuit. The same reasoning can be applied to the processing of the track $Z_{N-1}$.

Preferably, this sequencing makes use of the "inactive" cycles present in the sub-frames of the CCD so as not to modify the cross-talk correction structure. This means that, in our example, the samples $Y_{M-1}$ and $Y_{M-m}$ generated by the CCD during the discharge period are replaced by the samples $X_{N-1}$ and $Z_0$ respectively, coming from the other trains. This is shown in FIG. 6a.

Figure 6B:
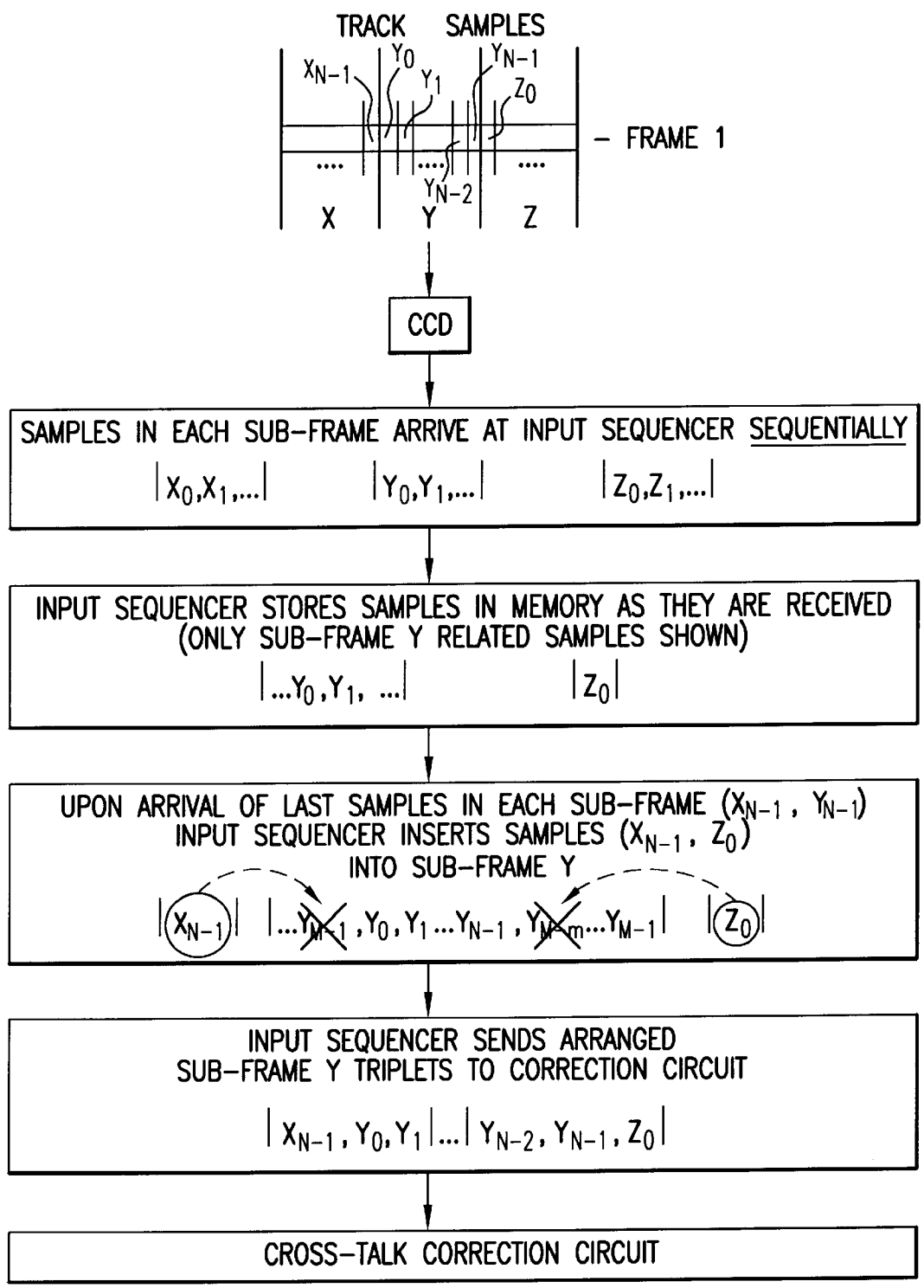

Another view of the working of the input sequencer 3 is presented in FIG. 6b. Three sub-frames of information (X, Y, Z) are depicted as being read from the information medium by the CCD. The active samples 0 to N-1 followed by the inactive samples M-m to m-1 in each sub-frame (X, Y, Z) arrive sequentially at the input sequencer 3 in three separate groups, each group corresponding to a sub-frame. As with FIG. 6a, only the handling of samples in sub-frame Y are shown in significant detail in FIG. 6b. After receiving the uncorrected samples for each sub-frame, the input sequencer 3 stores the full set of samples for each sub-frame (i.e. $Y_0$, $Y_1 \ldots Y_{N-1}, Y_{M-m} \ldots Y_{M-1}$). In addition, the sample $Z_0$ is also stored by the input sequencer 3. This sample $Z_0$ may be stored in a dedicated memory or may come from the full sub-frame Z stored by the input sequencer 3. The input sequencer 3 then waits for the last active samples in each train (such as $X_{N-1}$) to arrive. Finally, samples $X_{N-1}$ and $Z_0$ are inserted next to samples $Y_0$ and $Y_{N-1}$ respectively replacing inactive samples $Y_{M-m}$ and $Y_{M-1}$ respectively before the triplets corresponding to each sample to be corrected in sub-frame Y are passed on to the correction circuit 2.

However it is not necessary for the CCD to possess "inactive," cycles. Indeed, the idea of the invention is always to have a triplet of three successive samples for each sample in the train Y corresponding to a central sample and its two neighbors to the right and to the left. This is done by the storage of the samples of the neighboring trains. The storage may be done with digital memory cells, as would be readily apparent to one skilled in the art. Alternatively, the storage may be done with capacitors, inductors, or other analog means, as would also be readily apparent to one skilled in the art. If there is not a sufficient number of "inactive" cycles or no "inactive" cycles at all available for the samples stored, it is not possible to replace all the samples of a train without losing useful samples. For the processing of the sample $Y_0$ for example, normally the "inactive" sample $Y_{M-1}$ is replaced by the sample $X_{N-1}$. However, if the sample $Y_{M-1}$ does not exist, the useful sample $Y_{N-1}$ is found in its place. This sample $Y_{N-1}$ cannot be replaced by $X_{N-1}$. In this case, this useful sample $Y_{N-1}$ must be repositioned at the input of the correction circuit for only one clock cycle. This can be done, for example, by means of the multiplexing circuit 55 and 56 in FIG. 5d. For the processing of the sample $Y_0$ during the clock cycle $h_0$, the useful sample $Y_{N-1}$ is replaced by the sample $X_{N-1}$. Similarly, for the processing of the sample $Y_{N-1}$ during the clock cycle $h_{N-1}$, the useful sample $Y_0$ is replaced by the sample $Z_0$.

Figure 7:
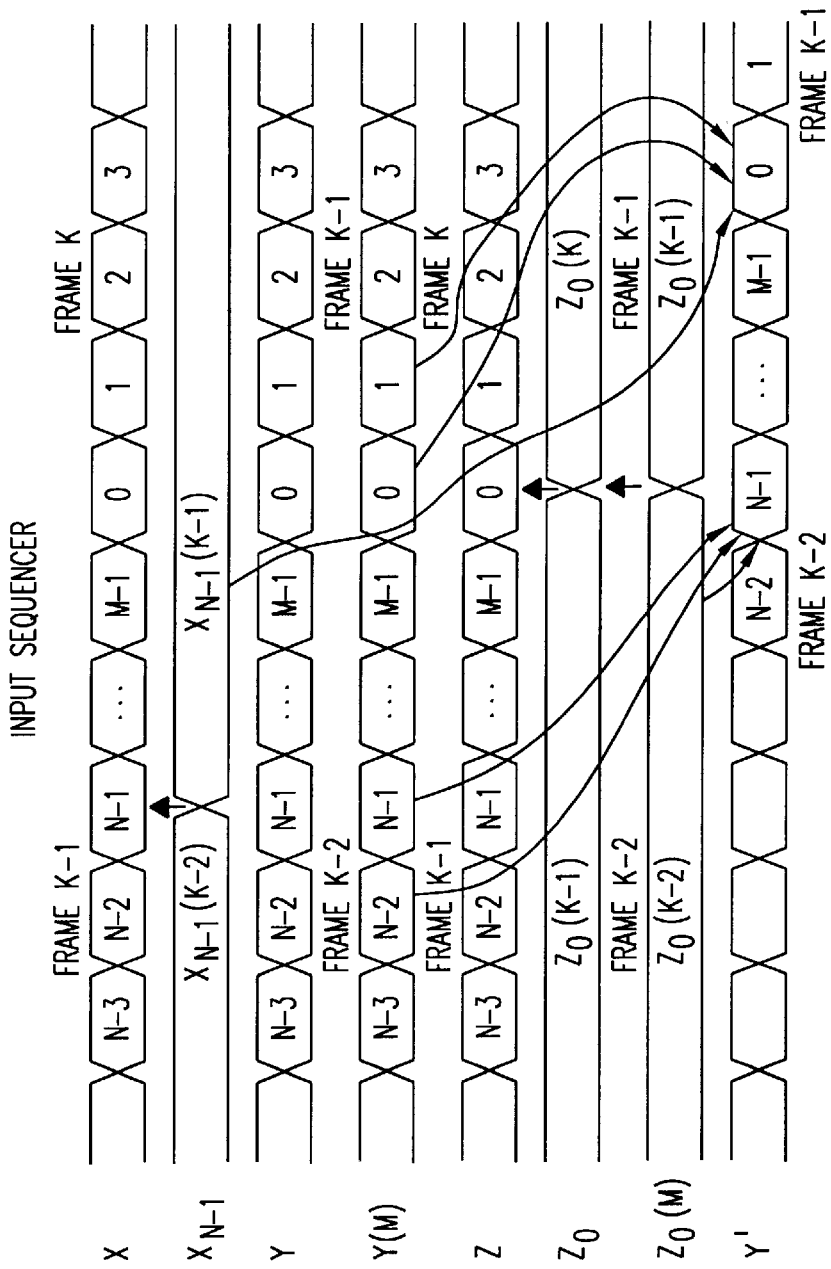
FIG. 7 shows a sequencing of the data elements and the computations in the input sequencer.

FIG. 7 shows a sequencing of the data elements and computations according to a possible embodiment of the input sequencer. The three arrows to the right show the triplet of samples $[X_{N-1}, Y_0, Y_1]$ used to compute the cross-talk on the sample $Y_0$. The three arrows to the left show the triplet $[Y_{N-2}, Y_{N-1}, Z_0]$ needed to compute the cross-talk on $Y_{N-1}$.

Furthermore, it is not necessary to store all the samples in the sub-frame Y. For example, to compute the cross-talk on $Y_0$, it is possible to memorize only the samples $Y_0$ and $Y_1$ during the frame k−1 and compute the cross-talk on $Y_0$ in the frame k that follows. As described here above, it is possible to exploit the "inactive" cycles or use multiplexing circuits should there be no inactive cycles. In any case, the sample $Y_0$ corrected for cross-talk is not always ordered in the sub-frame coming from the previous frame but this may be re-ordered downline by an appropriate re-ordering circuit.

The working of the input sequencer is identical for the outputs X and Z. The signal and information storage and mathematical processing operators may be implemented using common, analog and/or digital signal processing circuits, as are well-known in the art. This processing may also be performed with software, using techniques which are well-known in the art and which can be easily implemented by a programmer of ordinary skill.

Figure 8A:
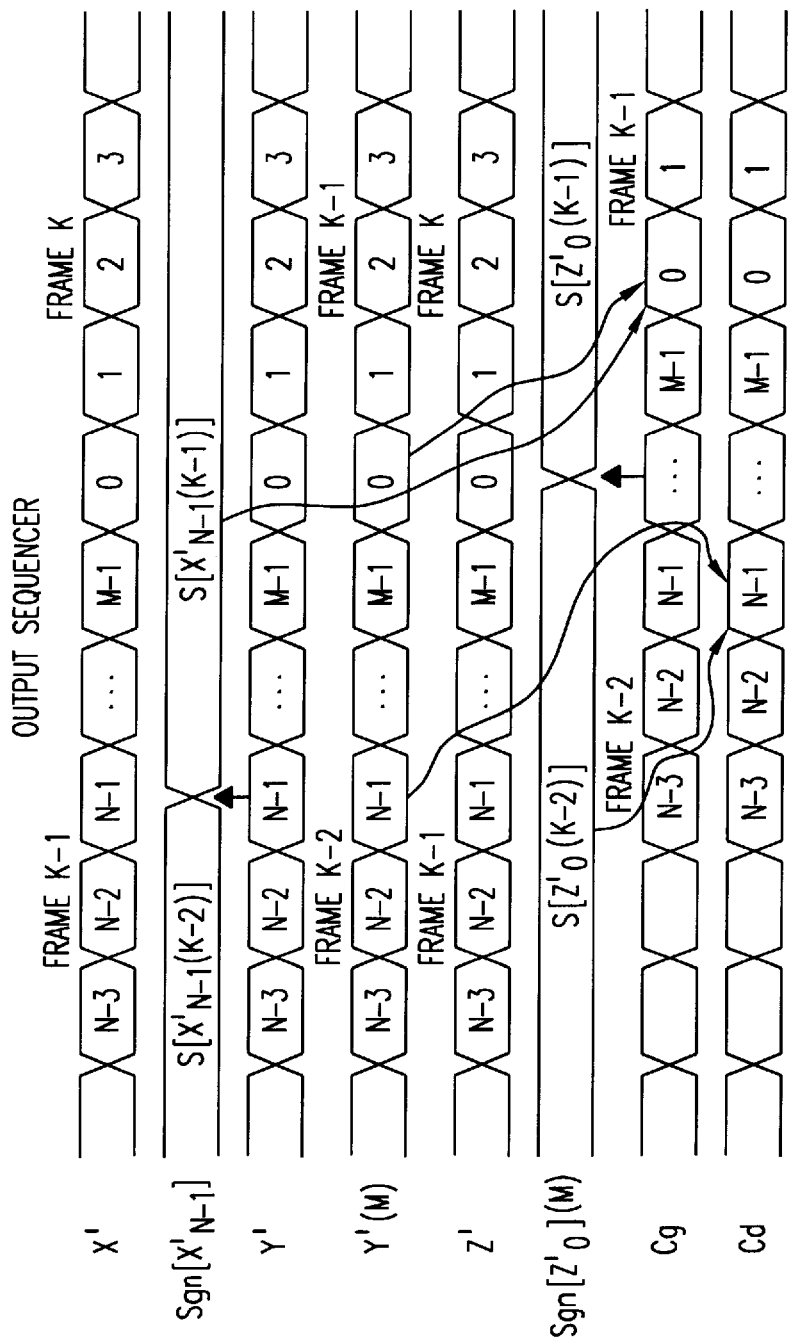
FIGS. 8a and 8b shows a sequencing of the data elements and computations in the output sequencer.

An output sequencer 6 is needed for the efficient operation of the cross-talk estimation operators 4 because, as described here above, they too need the neighboring samples. The working of the output sequencer 6 is similar to that of the input sequencer 3. FIG. 8a shows the sequencing of the data elements and computations in a possible embodiment of this sequencer.

In particular, the estimation circuits for estimating the coefficients 4 await a triplet $[Sgn(S'_{p-1}), S'_p, Sgn(S'_{p+1})]$ with S' from a train of samples corrected for cross-talk, wherein Sgn represents the signed function and p represents a track. For the 1 to N−2 ranking samples, the output sequencer has no effect on the order of the samples.

For the processing of the 0 ranking samples, a full storage of the current frame, namely Y', makes it possible to await the information $X'_{N-1}$ coming from the neighboring output but belonging to the same frame. The sign of $X'_{N-1}$ is used instead of the sample prior to $Y'_0$ (i.e. $Y'_{M-1}$) and the estimation of the cross-talk coefficients may be done for the samples of this rank.

For the $_{N-1}$ ranking samples, the same approach is followed: the sign of $Z'_0$ is memorized and inserted at the right time to form the triplet $[Sgn(Y'_{N-2}), Y'_{N-1}, Sgn(Z'_0)]$ required at the input of the cross-talk estimator.

Finally, the processing of the external tracks, in this case $X'_0$ and $Z'_{N-1}$, dictates the use of samples of a neutral value for the estimator in order to simulate the presence of neighboring tracks.

Figure 8B:
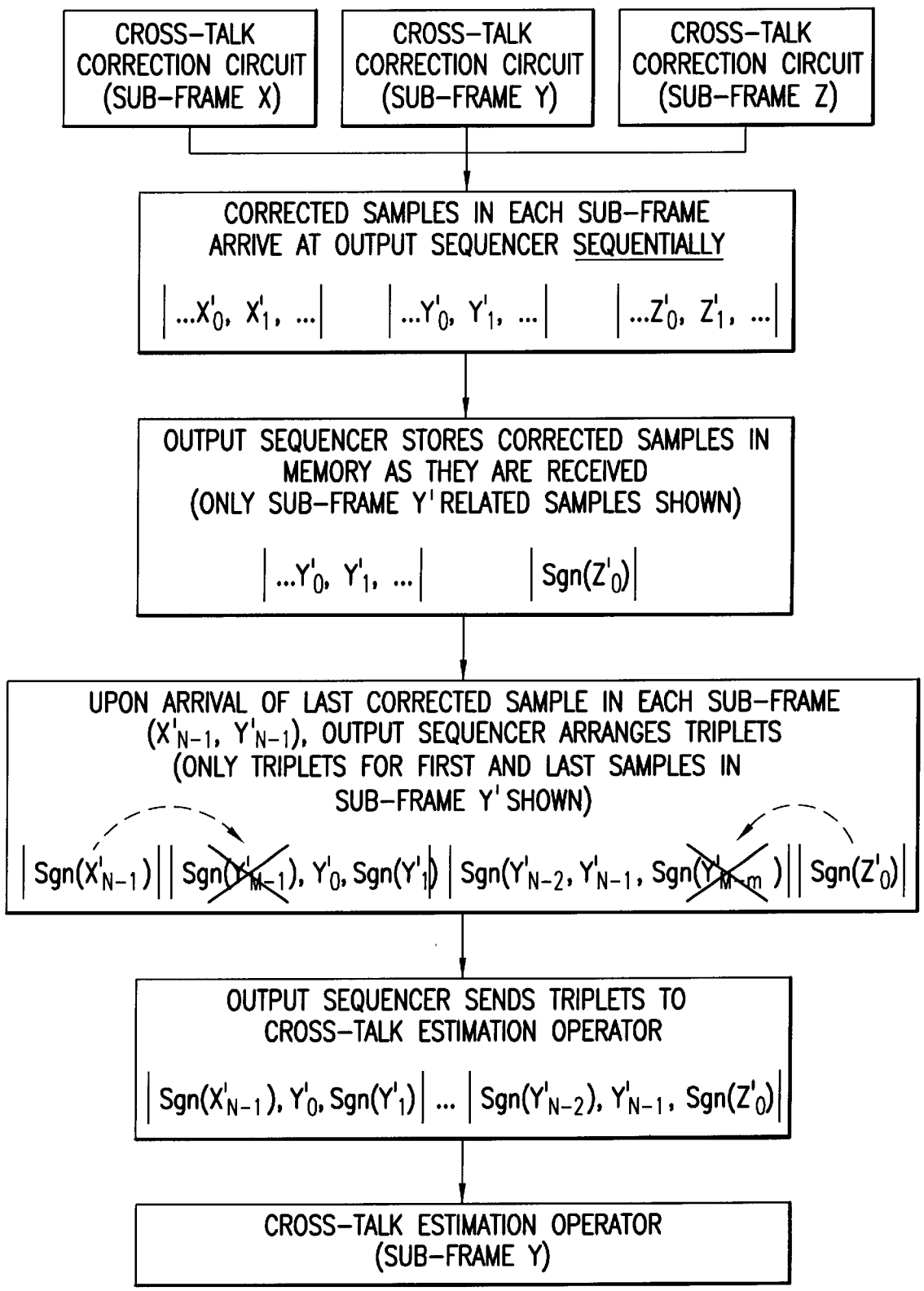

Another view of the working of the output sequencer 6 is presented in FIG. 8b. Here again, only the Y sub-frame samples are shown in any significant detail in the Figure. Each cross-talk correction circuit 2 sends a corrected sub-frame of samples to the output sequencer 6 so that the output sequencer 6 receives corrected sub-frame Y' (i.e. $Y'_0, Y'_1 \ldots Y'_{N-1} \ldots$). The output sequencer memorizes the full corrected sub-frame Y' as it arrives as well as the sign of the sample $Z'_0$. The output sequencer 6 then waits for the last sample in the corrected X' sub-frame ($X'_{N-1}$) and the last sample in the Y' sub-frame ($Y'_{N-1}$). As discussed above, the cross-talk estimation operator 4 for the Y sub-frame requires triplets for each sample in the form of the central sample itself and the sign of the sample's left and right neighbors. Consequently, for the first and last samples in the Y' sub-frame, the output sequencer 6 prepares triplets of the form $\{Sgn(X'_{N-1}), Y'_0, SgnY'_1)\}$ and $\{Sgn(Y'_{N-2}), Y'_{N-1}, Sgn(Z'_0)\}$ and the completed triplets are sent to the cross-talk correction estimator 4.

Figure 9A:
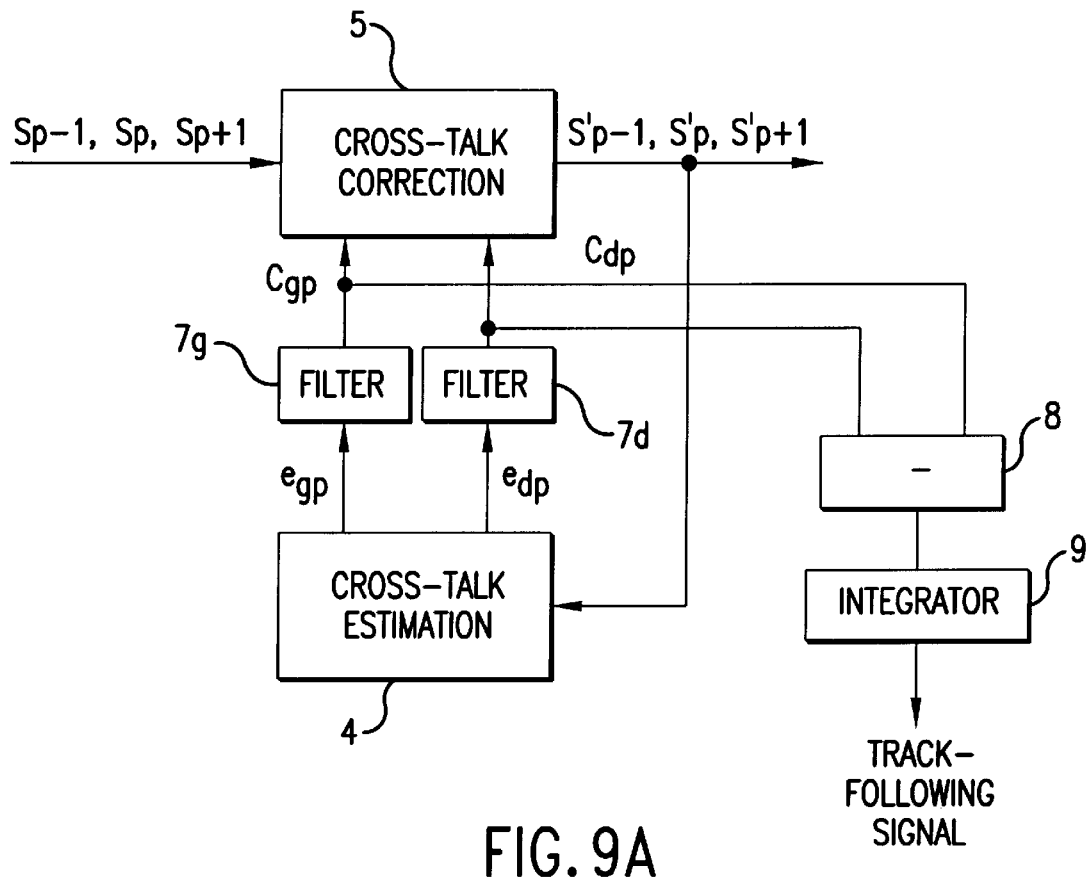
FIGS. 9a to 9c show an alternative embodiment of the correction circuit.

FIG. 9a shows a preferred alternative embodiment of the cross-talk correctors 2 according to the invention. In this circuit, the residual cross-talk errors are transmitted to integrator filters 7g and 7d. These filters continually integrate the cross-talk coefficients. The operation performed by the X integrator filters is the following:

$C_{pg}(k)=C_{gp}(k-1)+k'e_{gp}$ and $C_{dg}(k)=C_{dp}(k-1)+k'e_{gp}$ that is, for a sample in the frame k, the new estimated value of the cross-talk coefficient $C_{gp}$ or $C_{dp}$ is equal to the value of the same sample in the frame k−1 corrected by a fraction k' of the residual error $e_{gp}$ or $e_{dp}$. Here, the cross-talk coefficients of the previous embodiment have been renamed residual errors in the present embodiment.

Figure 9B:
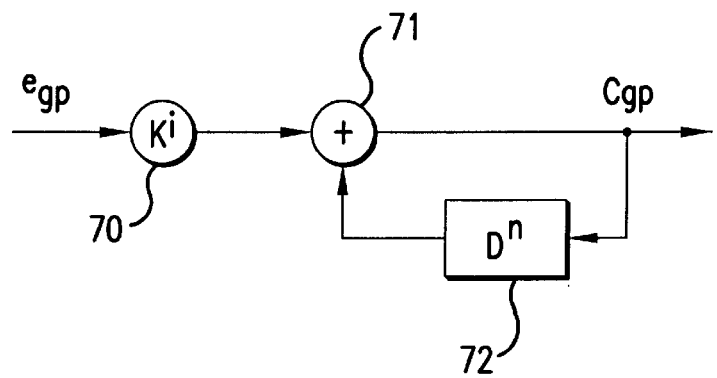

FIG. 9b shows an exemplary embodiment of these filters. A circuit 70 carries out the weighting, by means of a coefficient k' (smaller than 1), of the residual cross-talk coefficient $e_{gp}$. The weighted coefficient is transmitted to an input of an addition circuit 71 whose output is looped to another input by a memory circuit 72. It can therefore be seen that the residual cross-talk coefficient $e_{gp}$, weighted by the coefficient k', is added to the value of the cross-talk coefficient computed here above for the same track.

After the filtering of this instantaneous error, the coefficients are available after a storage step needed to put them in phase for a new correction computation. It is because it has been assumed that the cross-talk undergoes practically no change between different samples that it is possible to correct the samples by using the coefficients computed at a previous instant.

Figure 9C:
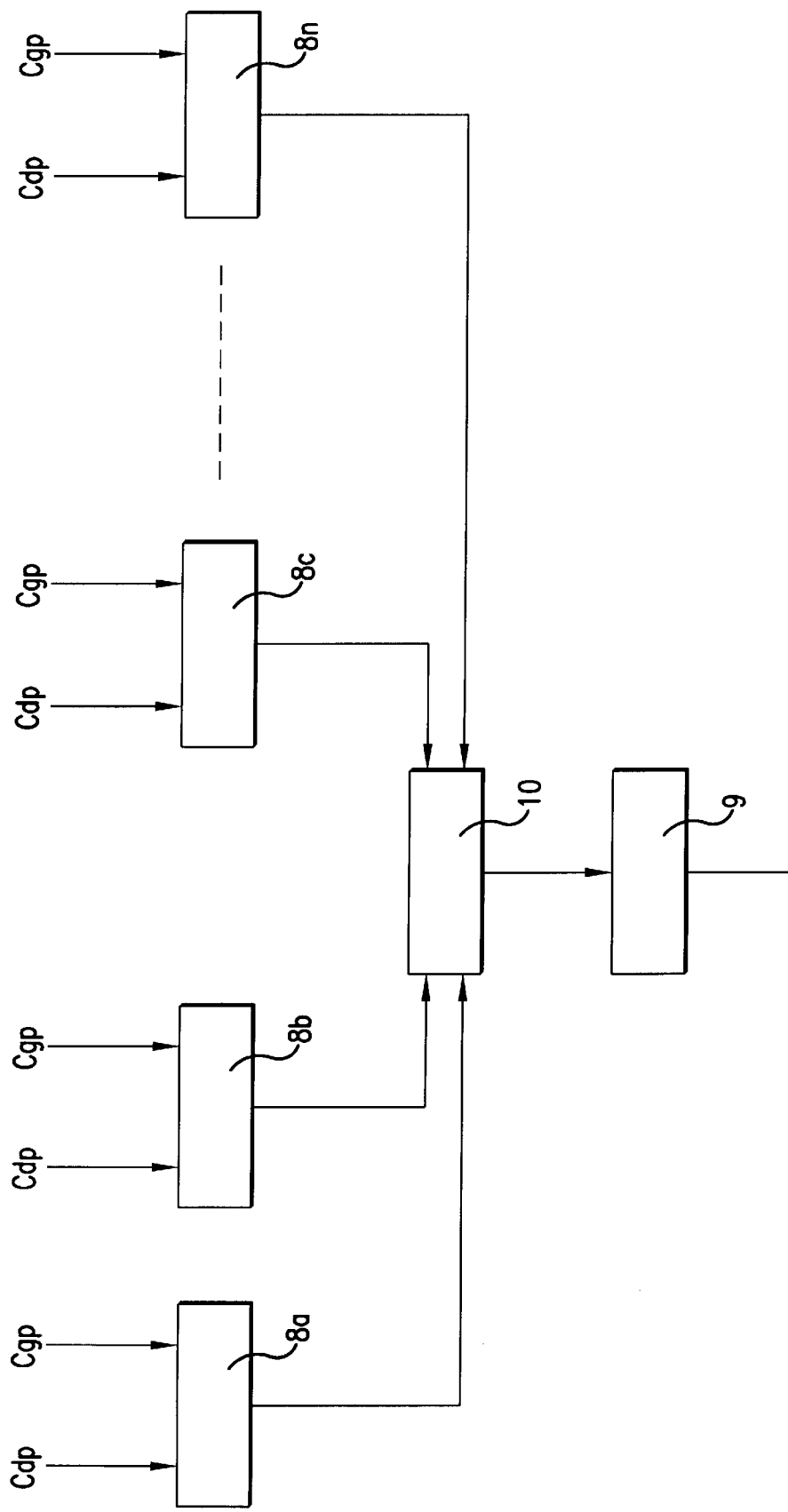

Furthermore, the circuit of FIG. 9a also enables the computation of a track-following signal to control the track-following device TL5 described here above or the respective positions of the detector TL6, the optical system TM4 and the transducer TL1. This is achieved by means of a subtraction circuit 8 that is connected to the outputs of the filters 7g and 7d and takes the difference between the cross-talk coefficients. To prevent any sudden variation of the cross-talk coefficients from having an immediate effect on the track-following device, the difference $C_{gp}$-$C_{gd}$ is integrated with the n tracks possessed by the recording medium. A track-following signal is obtained. The average value of this signal for all the tracks can be taken to give a result that is unaffected by the phenomena affecting a particular track. More specifically, since the system of the invention computes the cross-talk coefficients of several sub-divisions of a CCD, it is appropriate to carry out the integration on all these coefficients. This is why, as shown in FIG. 9c, there is provision for several subtraction circuits 8a to 8n that take the difference $C_{gp}$-$C_{dp}$ for each sub-division of the CCD. A multiplexer reader 10 successively reads the outputs of the subtraction circuits 8a to 8n and sends the integrator 9 successively the differences $C_{gp}$-$C_{dp}$ for all the sub-divisions. The track-following signal is therefore obtained from an average value based on the cross-talk coefficients of all the sub-divisions of the CCD.

Figure 10A:
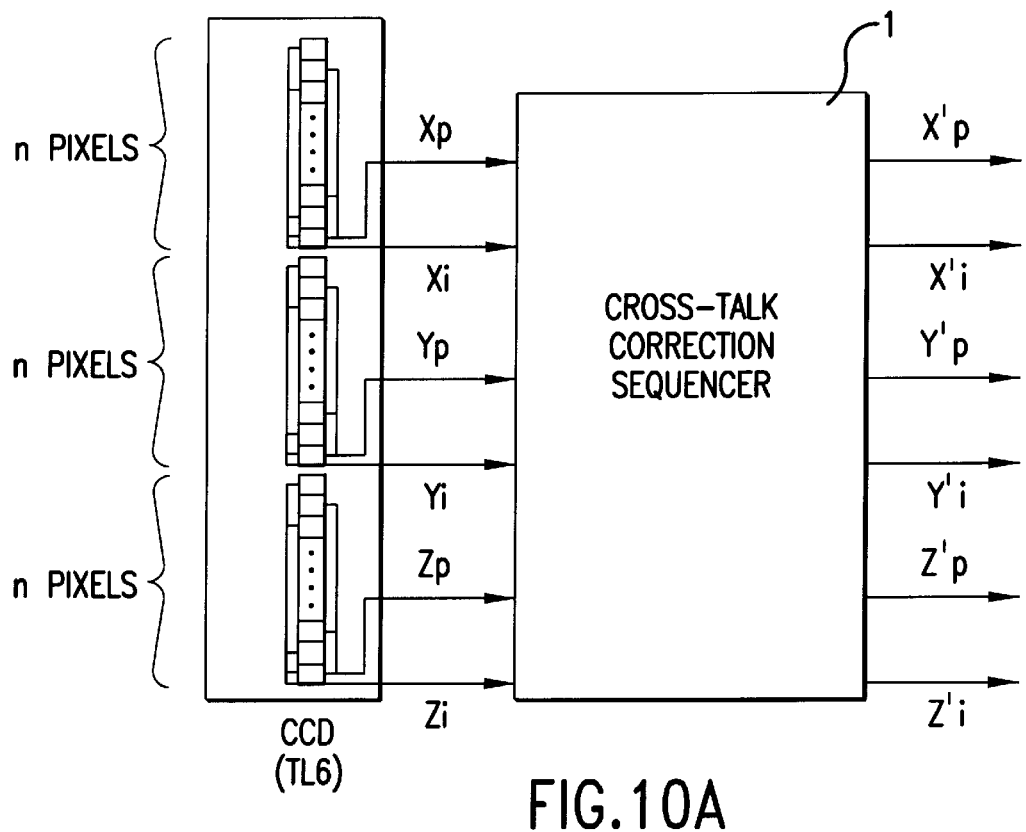
FIGS. 10a and 10b show a variant for a use with non-multiplexed outputs.
Figure 10B:
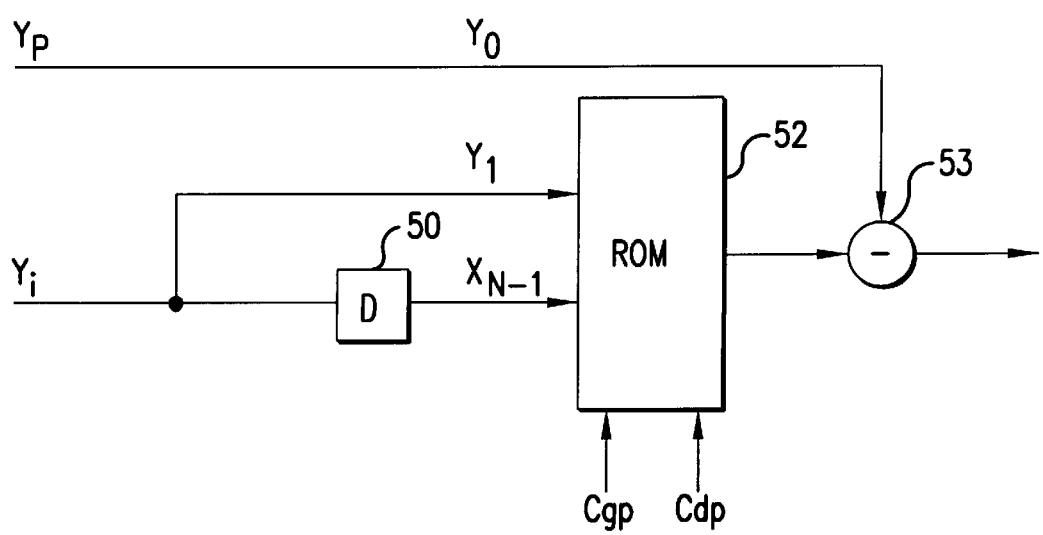
Figure 11:
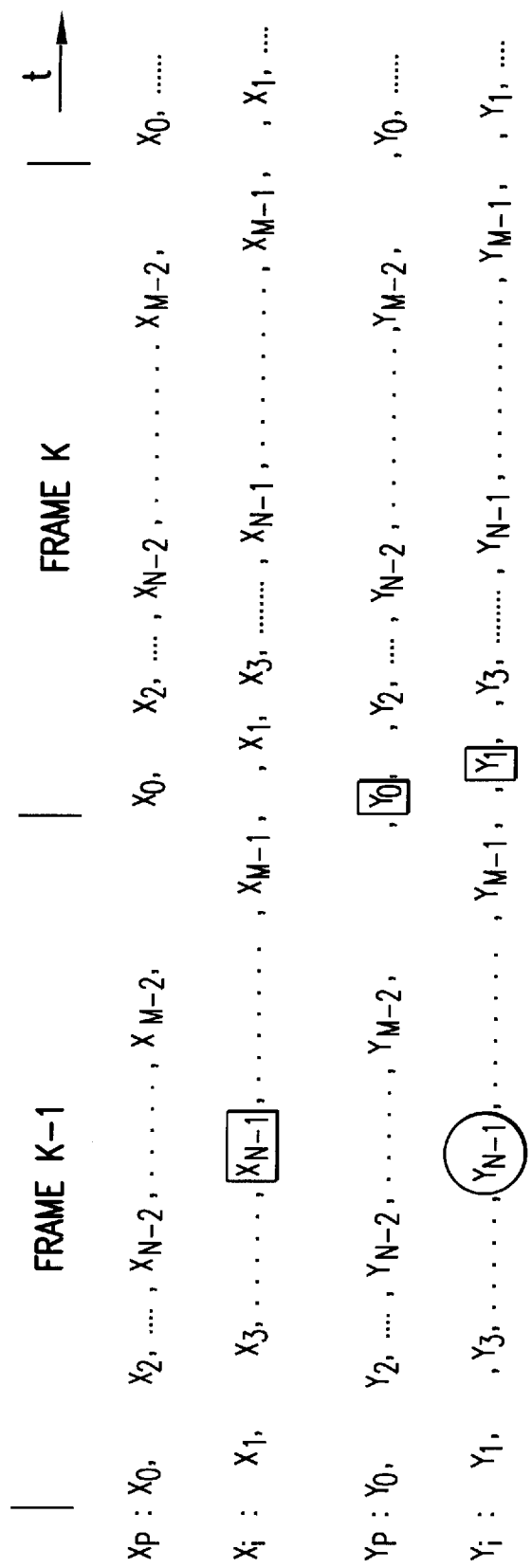
FIG. 11 shows a variation of the data elements selected by the input sequencer.

The cross-talk correction principle described here above works with series trains of samples multiplexed by output. However, the principle can be applied also to a CCD sensor that produces the trains of non-multiplexed samples (differentiated even-parity and odd-parity channels 0, 2, 4, ..., N–2 and 1, 3, ..., N–1) as described in the French patent application No. 94 14147 referred to here above. FIG. 10 is a diagram showing the principle for a use with non-multiplexed outputs. In this example, the sub-divided CCD sensor TL6 produces three pairs of even-parity and odd-parity trains $X_p$, $X_i$, $Y_p$, $Y_i$ and $Z_p$, $Z_i$. Each even-parity train has a sequence of sub-frames formed by series samples referenced 0 to M–2. Each odd-parity train has a succession referenced 1 to M–1. This is shown in FIG. 11. Each train contains a sample that is at the end of the CCD and must be corrected by the system of the invention. For example, the train $Y_p$ contains the sample $Y_0$ and the train $Y_i$ contains the sample $Y_{N-1}$ whose processing has been considered here above.

For the processing of the sample $Y_0$, it is necessary to give the correction circuit the same triplet $[Y_{N-1}, Y_0, Y_1]$ as in the case of the multiplexed train described here above. The samples of this triplet are indicated in squares in FIG. 11. In this case, the previous sample $Y_1$, namely $Y_{M-1}$, is replaced by the sample $X_{N-1}$ coming from the odd-parity train $X_i$.

The invention uses one correction circuit for each train. These circuits are the circuits described in the French patent application No. 94 14147 modified according to the principles described here above. FIG. 10b shows an exemplary embodiment of a correction circuit for the train $Y_p$. This circuit has available the train $Y_p$ which contains the sample $Y_0$ and the train $Y_i$ which contains the sample $Y_1$ and the sample $X_{N-1}$ which replaces the "inactive" sample $Y_{M-1}$.

Should there be no inactive cycle, the same principle of a circuit as that of FIG. 5d is applicable so as to replace the sample $X_{N-1}$ by $Y_{N-1}$.

The invention has been described in application to the reading of a magnetic tape, but can be applied to the reading of any information medium (tape, disk, board, etc.) that can be read by any means (magnetic means, optical means, etc.). Furthermore, in the above description, the information elements to be read are organized in the form of tracks but the invention can also be applied to the reading of information elements organized in the form of independent frames or even a single frame.

What is claimed is:

1. A device for the reading of a recording medium, said recording medium comprising at least one frame of information elements positioned side by side on the recording medium, and said device comprising:

a reading means carrying out the parallel reading of the information frame giving a train of samples in series ($X_{p-1}(k)$, $X_p(k)$, $X_{p+1}(k)$) corresponding to information elements on the recording medium; and a cross-talk correction circuit correcting the cross-talk on a central sample ($X_p(k)$) by means of neighboring samples);

wherein:

the reading means are sub-divided and give at least one first sub-frame (X) and one second sub-frame (Y) of samples in series (X,Y,Z); and wherein said cross-talk correction circuit comprises:

a cross-talk correction circuit for each sub-frame of samples outputting a train of samples corrected for cross-talk (X',Y',Z'); and an input sequencer outputting to each correction circuit a train of samples to be corrected $Y_S$ from a first sub-frame of samples (Y) and samples ($X_{N-1}$, $Z_0$) from at least one second sub-frame of samples (X, Z).

2. A device according to claim 1, wherein each cross-talk correction circuit comprises:

a cross-talk correction operator receiving the samples to be corrected ($S_{p-1}$; $S_p$, $S_{p+1}$) and cross-talk coefficients ($C_{gp}$, $C_{dp}$) that represent the possibly existing cross-talk from the neighboring information elements (p–1, p+1) on the central information element (p) and computing a cross-talk corrected signal $S'_{p-1}$, $S'_p$, $S'_{p+1}$); and a cross-talk estimation operator computing the cross-talk coefficients $C_{gp}$, $C_{dp}$).

3. A device according to claim 2, comprising:

an output sequencer receiving the cross-talk corrected signals (X', Y', Z') and giving each estimation circuit a modified train of samples (X's, Y's, Z's) containing all the samples needed for the estimation of the cross-talk coefficients of the samples in the input train.

4. A device according to claim 2, wherein the cross-talk correction operator comprises:

means performing the cross-talk correction of the train of samples (X, Y, Z) by doing the following operations:

$$S'_p = S_p - (C_{dp} * S_{p-1} + C_{gp} * S_{p-1})$$

$S_p$ is the train of samples to be corrected for cross-talk, $C_{dp}$ and $C_{gp}$ are the cross-talk coefficients that are computed by the estimation operator and that represent the cross-talk which may exist on the sample due to the samples located to its right (d) and to its left (g) on the tape in looking at it in the direction of its movement, $S'_p$ is the train of samples corrected for cross-talk.

5. A device according to claim 2, wherein the estimation operator comprises:

means computing the values of the cross-talk by performing the following operations:

$$e_{dp} = S'_p * Sgn[S'_{p+1}] \text{ and}$$

$$e_{gp} = S'_p * Sgn[S'_{p-1}]$$

$S'_p$ is the train of samples corrected for cross-talk.

6. A device according to claim 2, wherein each cross-talk correction circuit comprises, between the cross-talk estimation operator and the cross-talk correction operator, a filtering circuit working on cross-talk coefficients comprising:

a weighting circuit receiving a cross-talk signal ($e_{gp}$) and weighting it by means of a weighting coefficient k, an addition circuit receiving this weighted signal at a first input and having its output looped to a second input by a memory circuit applying, to this second input, a cross-talk coefficient computed previously for the same information element.

7. A device according to the claim 2, comprising:

a subtraction circuit connected to the cross-talk estimation circuit receiving the cross-talk coefficients in computing their difference and giving a track-following correction signal.

8. A device according to claim 7, comprising a subtraction circuit for the cross-talk coefficients of each sub-division of the CCD, a multiplexer reader successively reading the outputs of the two subtraction circuits and giving the results of the differences to an integrator circuit that gives a track-following signal.

9. A device according to claim 1, wherein:

the modified train of samples given by the input sequencer or the output sequencer contains the samples of a first sub-frame (X, Y, Z or X', Y', Z') as well as the neighboring samples, the samples at the ends of the sub-frame ($X_{N-1}$, $Z_0$) coming from other trains (X,Z).

10. A device according to claim 1, wherein the input sequencer or the output sequencer comprises:

means enabling the storage of at least two first samples of each sub-frame ($Y_0$, $Y_1$) neighboring a neighbor train.

11. A device according to claim 1, wherein the input sequencer or the output sequencer comprises:

means enabling the replacement, for each sub-frame (Y), of the cycles that are inactive during the periods for the discharging of the charges from the CCD sensor ($Y_{M-1}$, $Y_{M-m}$) by the neighboring samples ($X_{N-1}$, $Z_0$) coming from the neighboring sub-frames (X, Z).

12. A device according to claim 1, wherein:

each output of the sub-divided reading means is adapted and gives at least one first sub-frame ($X_p$, $Y_p$, $Z_p$) and one second sub-frame ($X_i$, $Y_i$, $Z_i$) of samples in series, the samples of which correspond to information elements alternating on a tape; and comprising:

a cross-talk correction circuit for each sub-frame of samples giving a train of cross-talk corrected samples (X'p, X'i, Y'p, Y'i, Z'p, Z'i) ($X'_p$, $X'_i$, $Y'_p$, $Y'_i$, $Z'_p$, $Z'_i$).

13. A system for the reading of a recording medium comprising several information tracks recording in parallel, comprising:

a recording medium;

optical means to transmit an optical beam to the recording medium that retransmits this beam;

optical detection means to receive the beam retransmitted by the recording medium;

comprising:

a reading device according to one of the claims 1 to 12.

* * * * *